(12) United States Patent
Cook et al.

(10) Patent No.: US 7,114,079 B1
(45) Date of Patent: Sep. 26, 2006

(54) SECURITY ACCESS BASED ON FACIAL FEATURES

(75) Inventors: Robert W. Cook, Switzerland, FL (US); Michael J. Bultman, Jacksonville, FL (US)

(73) Assignee: ParkerVision, Inc., Jacksonville, FL (US)

( * ) Notice: Subject to any disclaimer, the term of this patent is extended or adjusted under 35 U.S.C. 154(b) by 0 days.

(21) Appl. No.: 09/518,722

(22) Filed: Mar. 3, 2000

Related U.S. Application Data

(60) Provisional application No. 60/181,510, filed on Feb. 10, 2000.

(51) Int. Cl.
  *H04K 1/00* (2006.01)
  *H04L 9/00* (2006.01)
  *G06K 9/00* (2006.01)
  G05B 19/00 (2006.01)
  G05B 23/00 (2006.01)
  G06F 7/00 (2006.01)
  G06F 7/04 (2006.01)
  G06T 1/00 (2006.01)

(52) U.S. Cl. ............ 713/186; 713/182; 713/183; 713/184; 713/185; 726/27; 726/28; 382/118; 340/5.52; 340/5.53; 340/5.82; 340/5.83

(58) Field of Classification Search .......... 340/5.83, 340/825; 382/118, 2, 5, 124; 380/200; 713/186; 348/373, 15, 154
See application file for complete search history.

(56) References Cited

U.S. PATENT DOCUMENTS 4,975,969 A * 12/1990 Tal ........................ 382/116

(Continued)

*Primary Examiner*—Ayaz Sheikh
*Assistant Examiner*—Shin-Hon Chen
(74) *Attorney, Agent, or Firm*—Sterne, Kessler, Goldstein & Fox, P.L.L.C.

(57) ABSTRACT

A card based security system determines security access by comparing the facial features of the card owner with the facial features of an applicant that is requesting access to a secure item. The facial features of an authorized card owner are stored in a medium of a security access card in the form of feature data. When an applicant presents the card for access, the card feature data is read from the card medium and compared to applicant's facial feature. The facial features of the applicant are determined by taking a picture, and generating applicant feature data that is similar in format to the card feature data. The card feature data is compared to the applicant feature data to determine a level of agreement. The applicant is granted security access if the agreement is above a threshold, and the applicant is denied access if the agreement is below a threshold. In an alternate embodiment, the card medium does not carry the feature data of the card owner. Instead the card medium carries an ID code that identifies the card owner, and the feature data of card owner is retrieved from a computer memory that catalogs the feature data using the ID code. In embodiments of the invention, the feature data represents normalized ratios of distances between face features of the person characterized by the feature data. The normalized ratios are sufficient to adequately represent a person's face for security access purposes. Exemplary ratios include the forehead-to-chin distance, nostril-to-nostril distance, and ear-to-ear distance, where the normalization factor is the eye-to-eye separation of the person. In embodiments of the invention, the card medium that holds the feature data or ID code is a magnetic medium. In an alternate embodiment, the card medium is a bar code. In a preferred embodiment, the card medium is a two dimensional bar code, such as PDF417. Commercially available 2-D bar codes (such as PDF417) can store approximately 1100 bytes of data per square inch. As such, the 2-D bar code has sufficient storage density to store the necessary feature data on an access card the size of an ATM card or an employee badge, which is desirable for portability.

49 Claims, 14 Drawing Sheets

U.S. PATENT DOCUMENTS

| | | | |
|---|---|---|---|
| 5,304,786 A | 4/1994 | Pavlidis et al. | 235/462 |
| 5,432,864 A * | 7/1995 | Lu et al. | 382/118 |
| 5,787,186 A * | 7/1998 | Schroeder | 382/115 |
| 5,835,616 A * | 11/1998 | Lobo et al. | 382/118 |
| 5,973,731 A * | 10/1999 | Schwab | 348/161 |
| RE36,580 E * | 2/2000 | Bogosian, Jr. | 382/116 |
| 6,069,655 A * | 5/2000 | Seeley et al. | 348/154 |
| 6,072,894 A * | 6/2000 | Payne | 382/118 |
| 6,111,517 A * | 8/2000 | Atick et al. | 340/5.83 |
| 6,141,052 A * | 10/2000 | Fukumitsu et al. | 348/373 |
| 6,424,249 B1 * | 7/2002 | Houvener | 340/5.82 |
| 6,522,772 B1 * | 2/2003 | Morrison et al. | 382/124 |
| 6,657,538 B1 * | 12/2003 | Ritter | 340/5.81 |

* cited by examiner

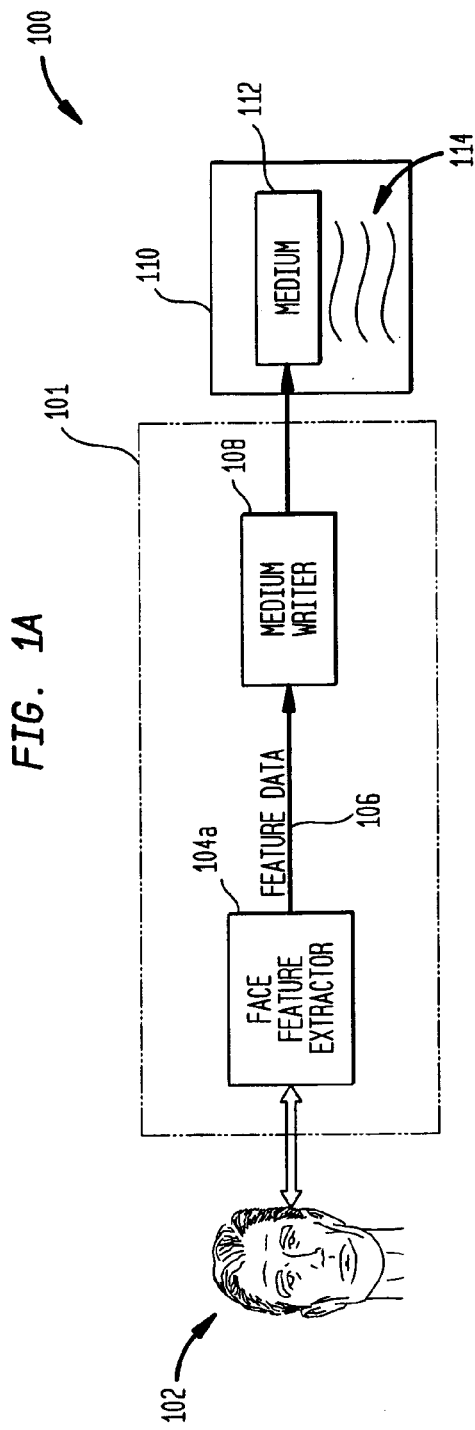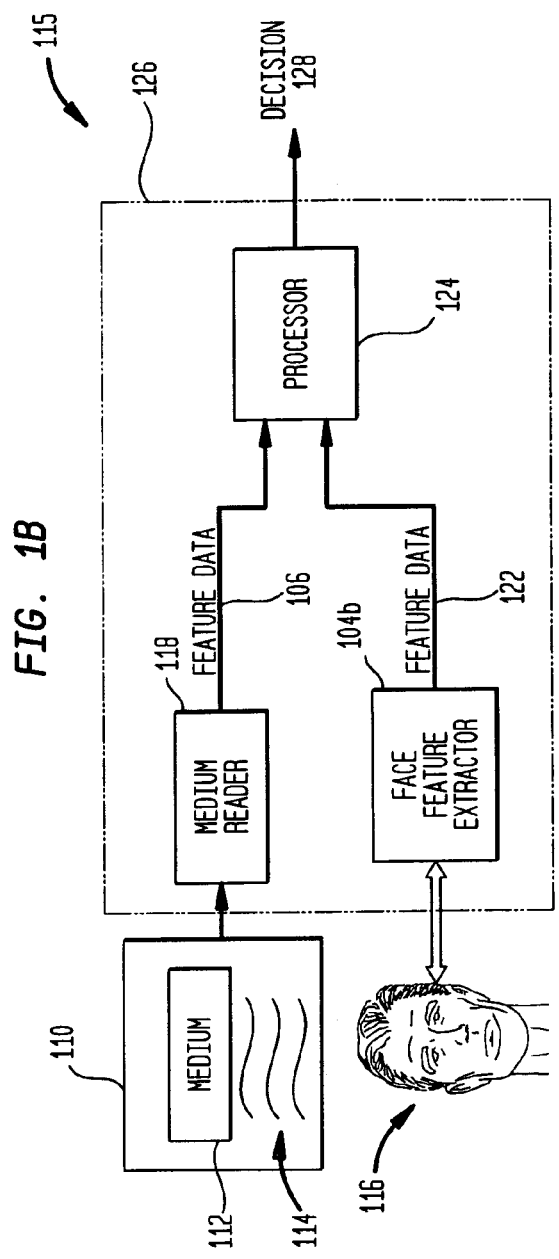

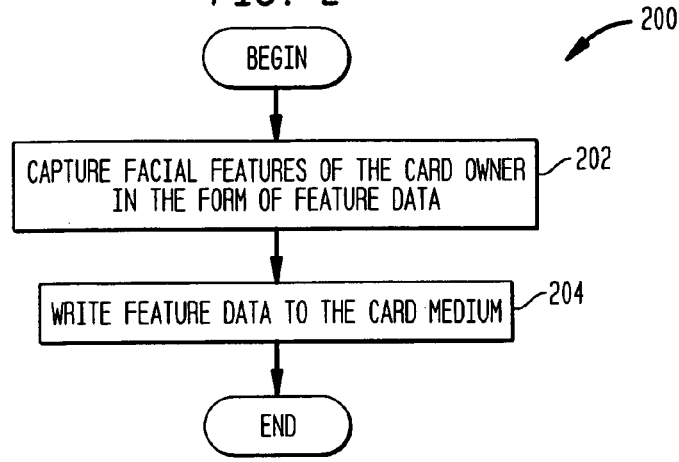
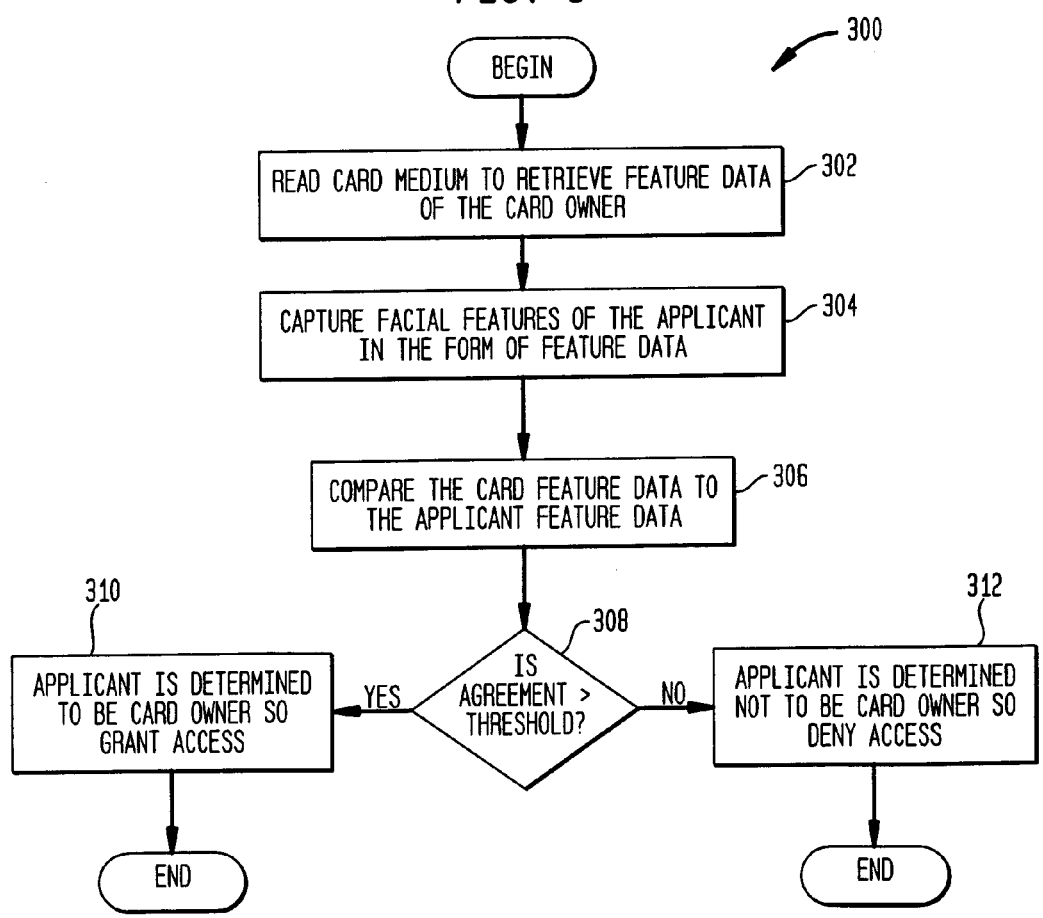

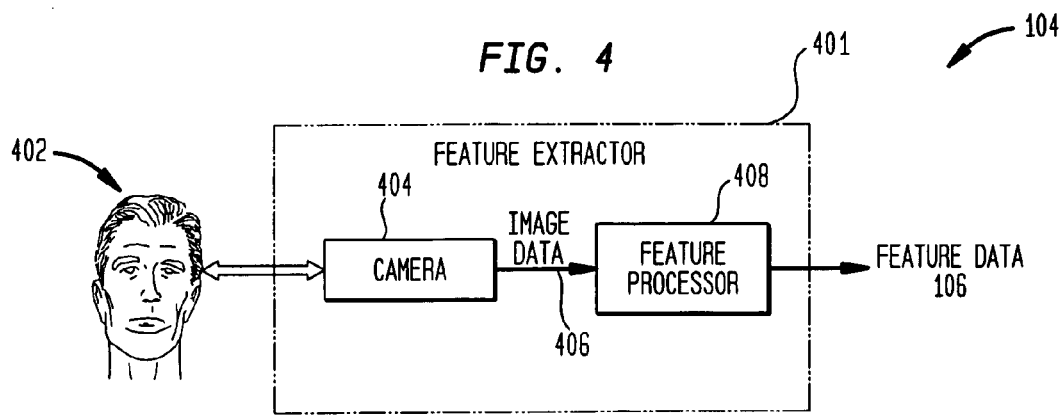
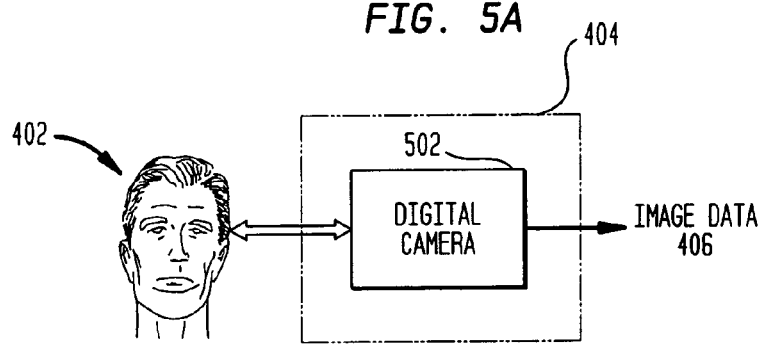
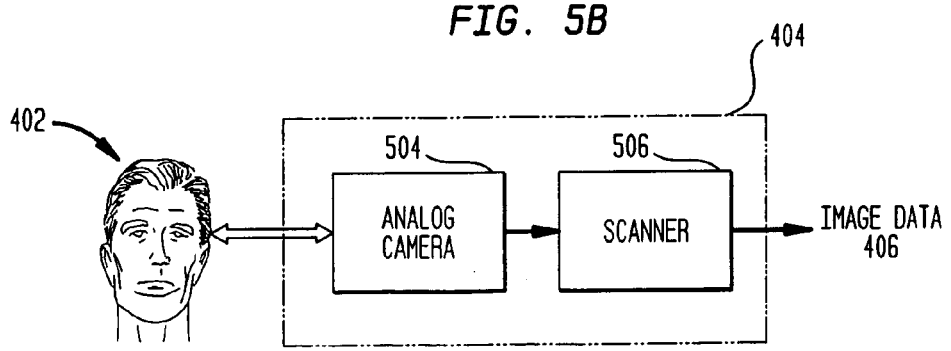

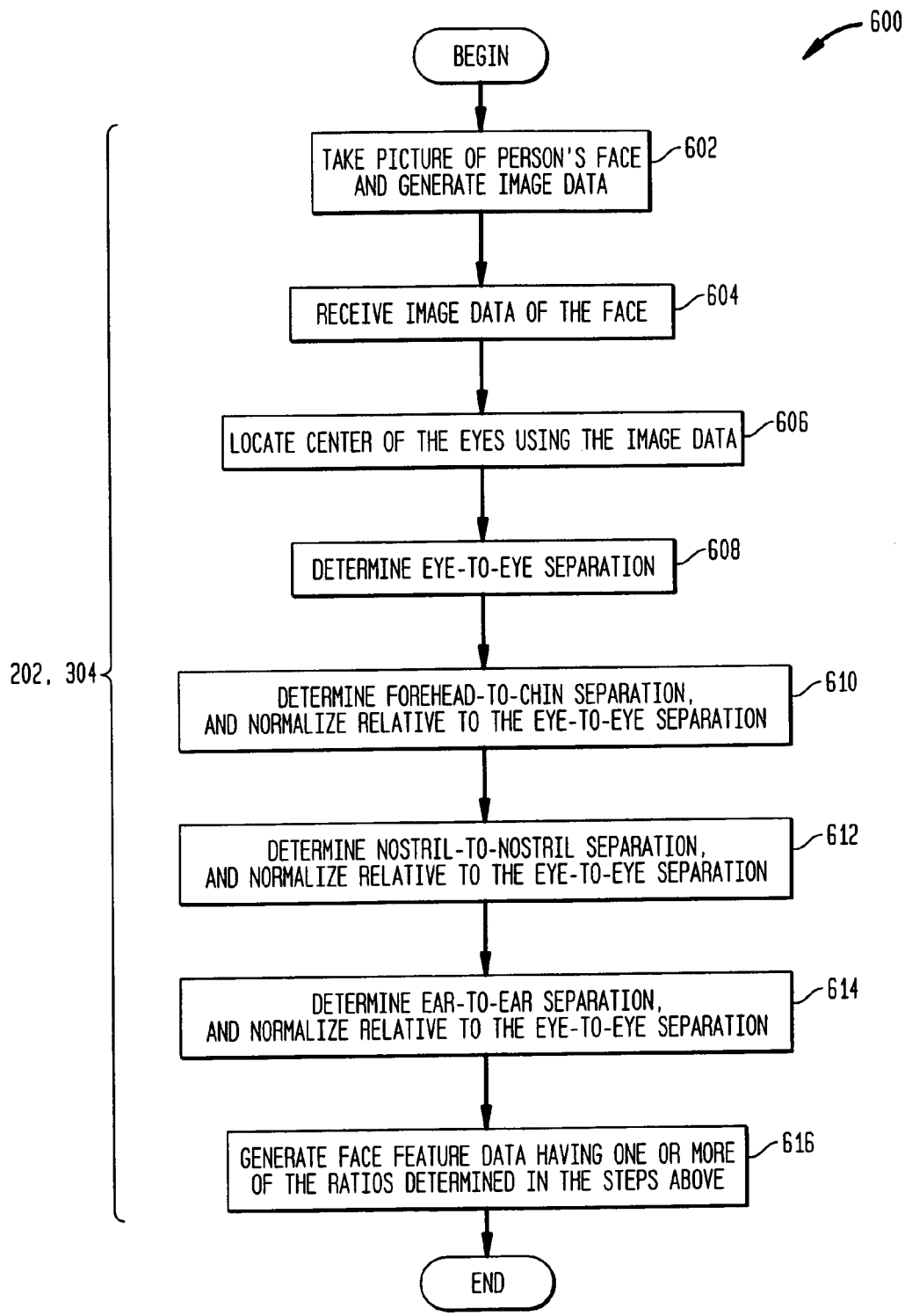

SECURITY ACCESS BASED ON FACIAL FEATURES

This application claims the benefit of the U.S. Provisional Application No. 60/181,510, filed on Feb. 10, 2000.

BACKGROUND OF THE INVENTION

1. Field of the Invention

The present invention is generally related to recording facial features (and/or information representative thereof) in a storage medium, and security applications of the same.

2. Related Art

Various systems and methods exist for controlling access by human beings to buildings, automobiles, computers, financial assets including bank accounts using ATM cards and credit cards, and other items of value.

SUMMARY OF THE INVENTION

A card or token based security system determines security access by comparing the facial features of the card or token owner with the facial features of an applicant that is requesting access to a secure item. The facial features (and/or information representative thereof) of an authorized card or token owner are stored in a medium of a security access card in the form of feature data. When an applicant presents the card for access, the card feature data is read from the card medium and compared to the facial features of the applicant to determine if the applicant is the card owner. The facial features of the applicant are determined by taking a picture of the applicant's face, and generating applicant feature data from the picture that is similar in format to the card feature data. The card feature data is compared to the applicant feature data to determine a level of agreement. The applicant is granted security access if the agreement is above a threshold, and the applicant is denied access if the agreement is below a threshold. In an alternate embodiment, the card medium does not carry the feature data. Instead, the card medium carries an ID code that identifies the card owner, and the feature data is retrieved from a computer memory that catalogs the feature data using the ID code.

An advantage of the present invention over conventional card-based security systems is that an applicant (who is not the card owner) cannot gain access with an ill-gotten card (i.e. lost or stolen), because the card will not contain the necessary facial features for the invention to grant access. A second advantage is that the present invention does not require a PIN number to provide a second level of security beyond the physical possession of the access card. In the present invention, the second level of security is based on the facial characteristics of the card owner, which cannot be forgotten as a PIN number can.

In embodiments of the invention, the feature data represents normalized ratios of distances between face features of the person characterized by the feature data. The normalized ratios are sufficient to adequately represent a person's face for security access purposes. Exemplary ratios include the forehead-to-chin distance, nostril-to-nostril distance, and ear-to-ear distance, where these distances are normalized to the eye-to-eye separation of the person. An advantage of using normalized ratios for the feature data is that there is no need to control the distance between the camera and the person when their picture is being taken to generate the feature data.

In embodiments of the invention, the card medium that holds the feature data or ID code is a magnetic medium. In an alternate embodiment, the card medium is a bar code. In a preferred embodiment, the card medium is a two dimensional bar code, such as PDF417. Commercially available 2-D bar codes (such as PDF417) can store approximately 1100 bytes of data per square inch. As such, the 2-D bar code has sufficient storage density to store the necessary feature data on an access card that is the approximate size of a standard ATM card or an employee badge, which is desirable for portability. Three-dimensional bar codes could also be used to store the feature data.

Applications of the invention include any security application that attempts to control access by human beings to secure items. Exemplary applications include but are not limited to: building security, automobile security, computer access, and access to financial accounts through automated teller machines (ATMs) and the like.

Further features and advantages of the invention, as well as the structure and operation of various embodiments of the invention, are described in detail below with reference to the accompanying drawings. The drawing in which an element first appears is typically indicated by the leftmost character(s) and/or digit(s) in the corresponding reference number.

BRIEF DESCRIPTION OF THE FIGURES

The present invention will be described with reference to the accompanying drawings, wherein:

FIGS. 1A and 1B illustrate a diagram of a card based security system, according to embodiments of the invention;

FIG. 2 illustrates a flowchart 200 for recording facial features on an access card according to embodiments of the invention;

FIG. 3 illustrates a flowchart 300 for determining if an applicant is the owner of an access card for security access purposes;

FIG. 4 illustrates a face feature extractor according to embodiments of the invention;

FIG. 5A illustrates a digital camera 502 as an embodiment of the camera 404 in the feature extractor 401;

FIG. 5B illustrates an analog camera 504 and scanner 506 as an embodiment of the camera 404 in the feature extractor 401;

FIG. 6 illustrates a flowchart 600 for generating facial feature data according to embodiments of the invention;

DETAILED DESCRIPTION OF THE PREFERRED EMBODIMENTS

1. Overview

The present invention is related to utilizing facial features to recognize human beings for security (or access) applications. Such applications include, but are not limited to, controlling the physical access by human beings to buildings, automobiles, computers, etc. In embodiments of the invention, specific facial features of a person are determined and represented as data that is recorded in a storage medium located on a portable access card, token, or other identification object. Physical access to a secured object is controlled by determining if the facial features stored on the card match that of the person applying for access. If there is a match, then access is granted. If there is not a match, then access is denied. Exemplary storage mediums include a magnetic medium and an optical bar code with sufficient storage capacity to store a minimal number of facial features to identify the card owner. A preferable storage medium is 2-dimensional bar code, or a 3-dimensional bar code. In alternate embodiments, the access card does not carry the facial feature data, but carries an identification code that is associated with the card owner. The identification code is used to retrieve the facial features of the card owner from a computer memory for comparison with the applicant's face features. These embodiments are discussed herein for illustrative purposes only, and are not limiting. Other embodiments will be appreciated to person skilled in the relevant art(s) based on the teachings contained herein.

The invention may also be used to control access to financial assets through automated teller machines (ATMs) using ATM cards and/or credit cards that implement the invention. When an applicant wishes to access a financial account, the applicant presents the card and allows his face to be 'read' by the invention. The invention will then determine whether the applicant's face matches the data stored on the card, and permits access to the financial account if there is a match. An advantage over conventional systems is that ATM transactions can be completed without requiring the applicant to provide a personal identification number (or PIN), which can be forgotten or stolen by unauthorized users. The invention may also be used to authorize point-of-sale (POS) transactions that complete the purchase of a sales item using a debit card or credit card.

The invention is applicable to any application where controlled access to a secured object is desired.

2. Conventional Security Systems

Figure 10:
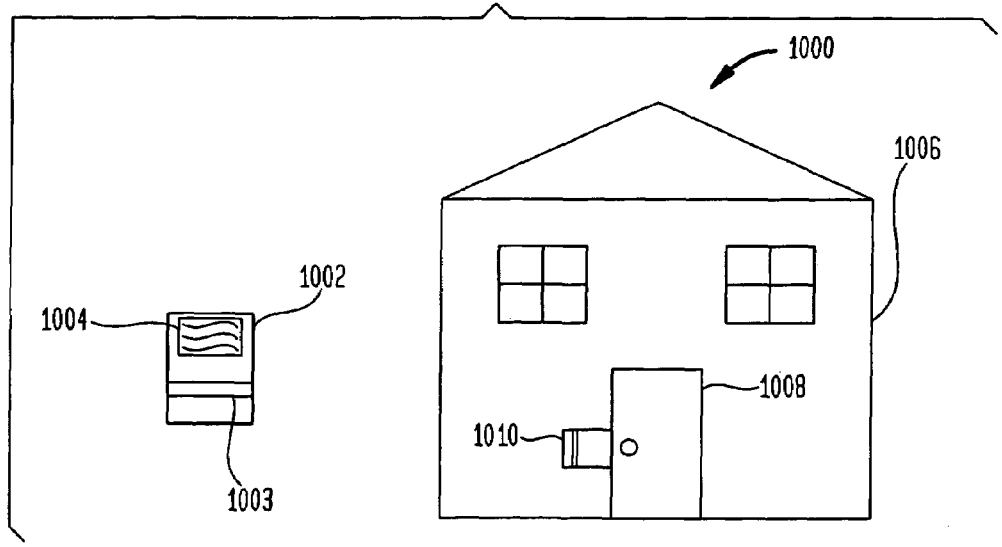
FIG. 10 illustrates a conventional card based security system.

Before describing the present invention in greater detail, it is useful to describe a conventional card-based security system. FIG. 10 illustrates a conventional card based security system 1000 including an access card 1002 that is used to gain access to a building 1006 through an entrance 1008. The conventional access card 1002 has a magnetic strip 1003 that is encoded with an access code. The access card 1002 may also have an optional picture 1004 of the card owner and/or optional text that identifies the card owner and/or associated building 1006. An applicant gains access by swiping the card 1002 through a card reader 1010 at the entrance 1008, where the card reader 1010 reads the access code on the magnetic strip 1003. If the card reader 1010 recognizes the access code, then the applicant is allowed to pass through the entrance 1008. A disadvantage of this conventional approach is that anyone can gain access to building 1006 as long as they have the card 1002. Therefore; an unauthorized user can gain access if the card 1002 is lost or stolen.

Conventional ATM machines typically include a second level of security that requires the applicant to provide a PIN number after the card is recognized by the ATM machine. However, the PIN number can be forgotten or stolen. If the PIN number is forgotten, then the card owner cannot gain access to the account even with the card. If the PIN is somehow disclosed to an unauthorized user, then the unauthorized user can gain access to the account with the card, and therefore defeat the security system.

3. Description of the Invention

FIGS. 1A and 1B illustrate recorder system 100 and reader system 115, respectively. Recorder system 100 and reader system 115 comprise a security system based on facial features, according to embodiments of the invention. Recorder system 100 includes face recorder 101 for recording facial features of a card owner 102 onto a medium 112 of an access card 110. Reader system 115 includes a face recognizer 126 for determining if an applicant 116 is the owner of the card 110 for security access purposes. To do so, face recognizer 126 compares the facial features of the applicant 116 with those features stored on card 110.

Card 110 is generally a portable access card (or any other object being used for security and/or identification purposes) that can be, for example, the approximate size of a ATM card or employee badge. Card 110 includes a medium 112 that stores the facial features of the owner 102 and optional text 114. Medium 112 can be any type of medium that has a storage capacity sufficient to store the feature data 106. In one embodiment, medium 112 is magnetic strip on the card 110. In a preferred embodiment, the medium 112 is an optical bar code, including a 2-dimensional or 3-dimensional bar code. Text 114 is optional because it is not required to practice the invention, but may be included for convenience. For an ATM-type card, text 114 may include for example, the name and account number of the card owner 102. For an employment badge, text 114 may include the employee's name, number, and picture. The employment badge may also include the employer name and address.

Referring now to recorder system 100 in FIG. 1A, face recorder 101 includes a face feature extractor 104a and a medium writer 108. Face recorder 101 is further described with reference to operational flowchart 200 that is shown in FIG. 2, and is discussed as follows.

In step 202, the feature extractor 104a captures selected the facial features of the card owner 102 and generates feature data 106 to represent the captured facial features. Any number and kind of facial features may be captured, provided that the features are sufficient in number and detail to adequately represent the face of owner 102. In other words, the feature data 106 has sufficient detail for the invention to adequately recognize the face of owner 102 for security purposes. The specific number and accuracy of the facial features recorded in medium 112 are implementation dependent, and will vary depending on the specific application. In one embodiment, the facial features are expressed in terms of relative ratios as further described in the following sections, although the invention is not limited to this embodiment.

In step 204, medium writer 108 records the feature data 106 in the medium 112 of the card 110. Once the facial features are stored on the card 110, the card owner 102 can use the card 110 to interface with associated security systems that operate according to the present invention, such as reader system 115 that is depicted in FIG. 1B.

Referring now to reader system 115, applicant 116 has presented the access card 110 to the face recognizer 126 in order to gain access to some restricted item(s) (as those mentioned above). Recognizer 126 includes medium reader 118, face feature extractor 104b, and processor 124. Recognizer 126 compares the relevant facial features of applicant 116 to those features stored on medium 112, and generates a decision 128 that indicates whether applicant 116 is the card owner 102. In other words, recognizer 126 determines whether the face features of applicant 116 are sufficiently close to those recorded on card 110 to allow access for the applicant 116. Recognizer 126 is further described with reference to operational flowchart 300 that is shown in FIG. 3.

Referring now to flowchart 300, in step 302, medium reader 118 reads card medium 112 to get a copy of the feature data 106. As stated above, the feature data 106 contains the facial features of the card owner 102 in sufficient detail to allow the recognizer 126 to identify the card owner 102 for security access purposes.

In step 304, face feature extractor 104b captures the necessary facial features (preferably similar to or a subset of those captured in step 202) of the applicant 116, and generates feature data 122. Face feature extractor 104b is similar to face feature extractor 104a, so that feature data 122 is adequately representative of the applicant 122 for security access purposes. Furthermore, feature data 122 has a format that is compatible with feature data 106 for comparison purposes.

In step 306, the processor 124 compares the card feature data 106 to the applicant feature data 122 to determine the level of agreement.

In step 308, the processor 124 determines if the agreement between the feature data 106 and feature data 122 is above a specified threshold. If yes, then the processor 124 determines that the applicant 116 is the card owner 102, and access is granted in step 310. If no, then the processor 124 determines that the applicant 116 is not the card owner 102, and access is denied in step 312.

An advantage of the present invention over conventional card-based security systems is that an applicant (who is not the card owner) cannot gain access with an illgotten card (i.e. lost or stolen), because the card will not contain the necessary facial features for the recognizer 126 to allow access. A second advantage is that the present invention does not require a PIN number to provide a second level of security beyond the physical possession of the card. In the present invention, the second level of security is based on the facial characteristics of the card owner, which cannot be forgotten like a PIN number can.

4. Embodiments of the Invention

Various embodiments related to the method(s) and structure(s) described above are presented in this section (and its subsections). These embodiments are described herein for purposes of illustration, and not limitation. The invention is not limited to these embodiments. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments.

a. Face Feature Extractor

A face feature extractor 104 is included in both the face recorder 101 and the face recognizer 126 as shown in FIGS. 1A and 1B. The face feature extractor 104 captures some of the facial features of a person and generates feature data that is representative the captured facial features. FIG. 4 illustrates feature extractor 401 as one embodiment of feature extractor 104. Feature extractor 401 includes a camera 404 and a feature processor 408.

Camera 404 takes a picture of the face of a person 402 (i.e. a headshot) and generates image data 406 that is representative of the picture, which is sent to feature processor 408. The camera 404 can be black-and-white or color, and can be any image input mechanism. The necessary resolution requirements for camera 404 are relatively minor for the invention to recognize the person 402 for security access purposes. In embodiments of invention, the resolution requirements can be as low as 50×50 pixels. In additional embodiments, the camera 404 is a digital camera 502 that is shown in FIG. 5A, so that the image data 406 is digital data that can be easily read by a computer processor. Alternatively, a standard analog camera 504 in combination with a scanner 506 can be used as shown in FIG. 5B, where the scanner 506 converts the picture into digital data (i.e. image data 406) that is readable by a computer processor.

Feature processor 408 is a computer processor that receives the raw image data 406 and converts the image data 406 into the feature data 106. The feature processor 408 can be any type of processor capable of performing calculations, including but not limited to a microprocessor or state machine. The feature data 106 is substantially more compact than the image data 406. Therefore, the feature data 106 requires significantly less storage space than the image data 406, which is desired for portability. In order for this to occur, the feature processor 408 calculates distances ratios between certain facial features of the person 402, based on the image data 406. These ratios are sufficient for the invention to identify the person 402 for security access purposes. The operations performed by the processor 408 to calculate the facial ratios are further described in steps 606–616 of operational flowchart 600 that is shown in FIG. 6. Steps 606–616 can be software that operates on the processor 408 as will be understood by those skilled in the relevant arts, or can represent functions performed by a hardware state machine. Flowchart 600 further defines step 202 of flowchart 200 (FIG. 2) and step 304 of flowchart 300 (FIG. 3), according to embodiments of the invention.

Figure 8:
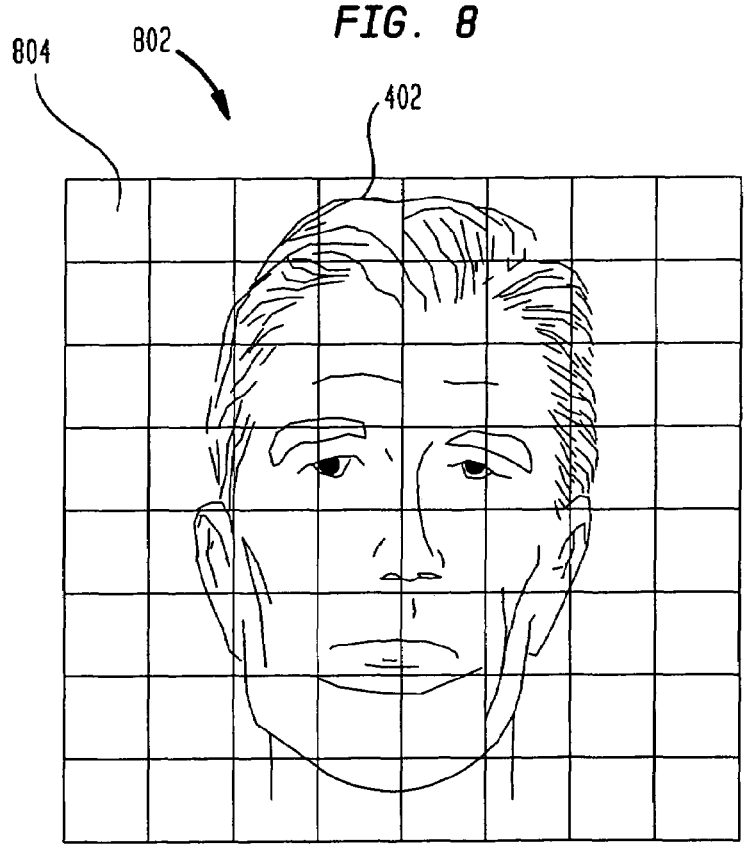
FIG. 8 illustrates a grid of pixels that characterizes the face of person 402 according to embodiments of the invention.

Referring now to flowchart 600, in step 602, the camera 404 takes a picture of the face of person 402, and generates image data 406 that is representative of the picture. More specifically, in an embodiment the image data 406 is representative of a grid of pixels that characterizes the face of person 402 for purposes of the invention. This is illustrated by grid 802 containing pixels 804 that are drawn over person 402 in FIG. 8. As stated, the grid 802 can have as little as 50×50 pixels. Preferably, the image data 406 is digital data that can be easily read by the processor 408. Therefore, the camera 404 can be a digital camera 502 (FIG. 5A), or an analog camera 504 in combination with a computer scanner 506 (FIG. 5B).

In embodiments of the invention, a profile shot of the person 402 may also be taken and included in the image data 406. This can be done by having the person 402 rotate its head, or by using a second camera that is located in an appropriate profile location. Furthermore, multiple pictures at different angles could be taken by having the person 402 rotate its head to multiple positions, or by having multiple cameras that take pictures at multiple angles, or by having a single camera that rotates around the person's head.

In step 604, the feature processor 408 receives the image data 406. As stated above, the image data 406 is generally readable by a computer processor, such as the feature processor 408.

In step 606, the feature processor 408 finds the location of the eyes of person 402 using the image data 406. Typically, a person's eyes are the most light reflective feature on a person's face, and the pupils of the eyes are the least light reflective feature. Based on this contrast, the location of the center of the eyes can be easily found in the pixel grid 802.

Figure 7:
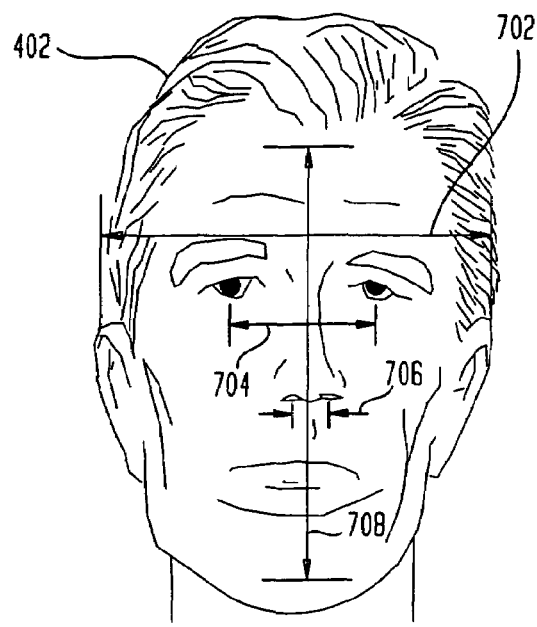
FIG. 7 illustrates example specific facial features of a person 402 that are included in feature data according to embodiments of the present invention.

In step 608, the feature processor 408 determines the separation between the eyes based on the location of each eye determined in step 606. This is further illustrated by FIG. 7, where the eye-to-eye separation 704 is depicted for the person 402. As discussed below, the eye-to-eye separation 704 is used to normalize the other features on the face of person 402 that are depicted in FIG. 7. The normalization calculations result in a smaller data file for the feature data 106. The invention may also locate the mid-point between the eyes using the location of the eyes, for feature location and normalization.

In step 610, the feature processor 408 determines the forehead-to-chin separation 708 normalized to the eye-to-eye separation 704. The location of the forehead can be found using the eye location and the hairline of the person 402. The location of the chin is at or near the bottom of the face.

In step 612, the feature processor 408 determines the nostril-to-nostril separation 706 normalized to the eye-to-eye separation 704. The nostrils are easily located as they reflect relatively little light compared with other parts of the face, and are generally located below the reflective eyes.

In step 614, the feature processor 408 determines the ear-to-ear separation 702 normalized to the eye-to-eye separation 704. Alternatively, the distance between the center of the eyes and each ear can be determined, wherein this distance can also normalized to the eye-to-eye separation 704. The facial features discussed above are considered herein for illustrative purposes. The invention can be used with other facial features, as well as the manner in which to analyze image data 406 to characterize such other features, will be apparent to persons skilled in the arts.

In step 616, the feature processor 408 generates the feature data 106 having one or more of the facial ratios determined in steps 608–614, and sends the feature data to the medium writer 108. The number of ratios included in the feature data 106 is variable and dependant on the specific security application to which the invention is being utilized. Furthermore, the ratios are not limited to those discussed in steps 608–616. Different ratios other than those mentioned above could be used. Furthermore, un-normalized feature distances could also be used as will be understood by those skilled in the relevant arts based on the discussion given herein. These other ratios and un-normalized distances are within the scope and spirit of the invention.

An advantage of using normalized distances to represent facial features is that the feature data 106 is much more compact than the raw image data 406, which is desirable when the feature data is to be carried on a portable access card. In embodiments of the invention, the feature data is well below 2 K bytes of data and can easily fit on available 2-dimensional bar code mediums. However, the compact feature data 106 still has enough accuracy to adequately describe the person 402 for security access purposes. A second advantage is that the normalization ratios alleviate any requirement for the invention to determine (or control) the distance between the person 402 and the camera 404 when the picture is taken. In other words, the normalized features on the access card can be compared with the corresponding normalized features of the applicant, without requiring either the applicant or the card owner to stand at a specific distance from the camera. A known camera distance would be necessary if un-normalized feature data were being compared, as will be understood by those skilled in the arts.

Figure 14:
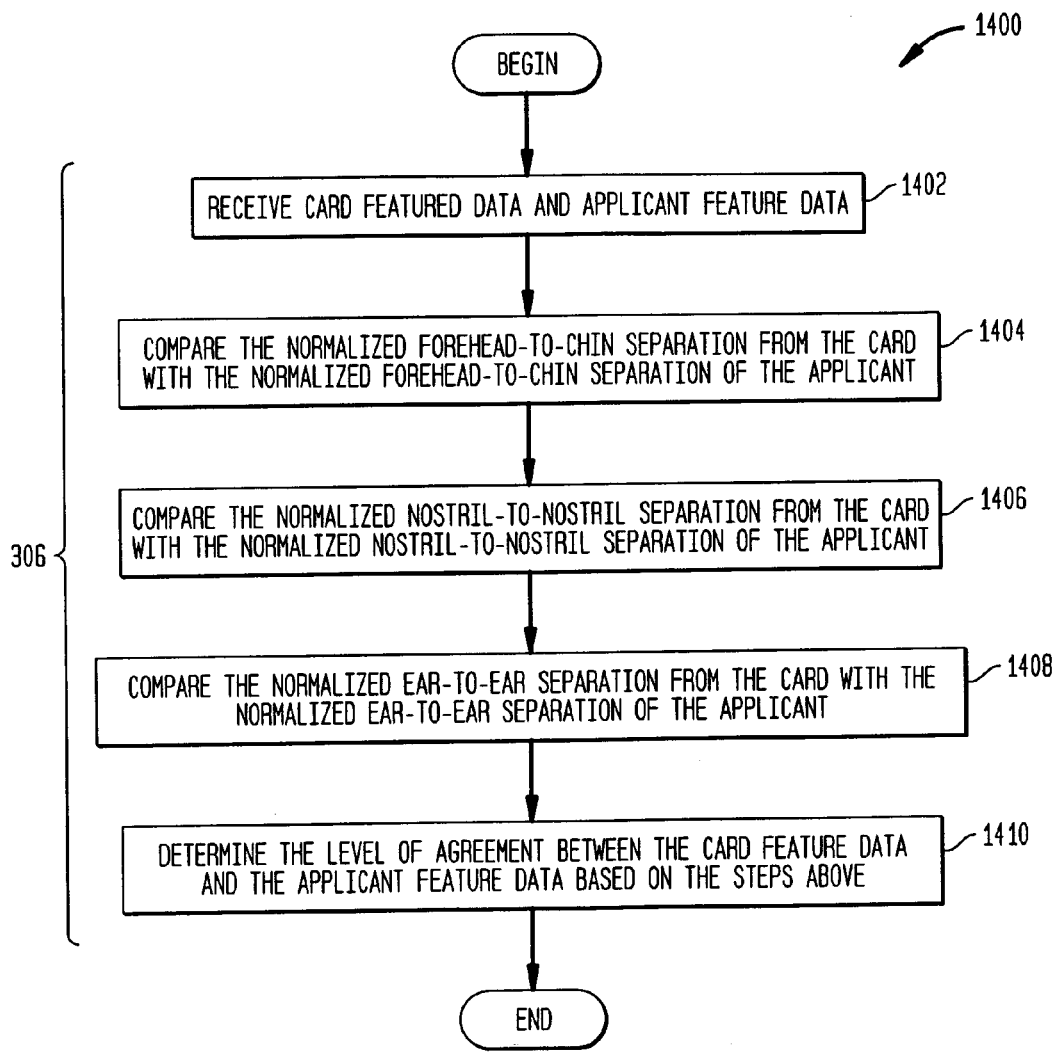
FIG. 14 illustrates a flowchart 1400 for comparing card feature data to applicant feature data according to embodiments of the present invention.

The comparison between the card feature data and the applicant feature data will now be described when the feature data contains the normalized ratios described above. To do so, FIG. 14 illustrates operational flowchart 1400, which further defines the comparison step 306 (in FIG. 3) when the feature data is comprised of normalized ratios as described above. Referring now to flowchart 1400, in step 1402, the processor 124 receives the card feature data 106 and the applicant features data 122. In steps 1404–1408, the processor 124 compares each normalized feature from the card feature data with the corresponding normalized feature from the applicant feature data, to determine an overall level of agreement in step 1410 for recognition and access purposes. More specifically, in step 1404, normalized forehead-to-chin separation from the card feature data is compared with the normalized forehead-to-chin separation of the applicant. In step 1406, the normalized nostril-to-nostril separation from the card feature data is compared with the normalized nostril-to-nostril separation of the applicant. In step 1408, the normalized ear-to-ear separation from the card feature data is compared with the normalized ear-to-ear separation of the applicant. In step 1410, an overall level of agreement between the card feature data and the applicant feature is determined based on steps 1404–1408.

In embodiments, a percentage error factor can be calculated for each comparison in steps 1404–1408. This can be done by subtracting the corresponding normalized ratios to determine a difference error for each of the steps 1404–1408, and then subsequently dividing the difference error by the respective normalized ratio from the card. For example, in step 1404, the normalized forehead-to-chin separation for the applicant can be subtracted from the corresponding ratio in the card feature data, resulting in a difference error. This difference error can then be divided by the normalized forehead-to-chin ratio in the card feature data, to calculate a percentage error for the step 1404. In step 1410, the percentage errors for each comparison (in steps 1404–1408) can be averaged to determine an overall average error percentage. This average error percentage can then be compared to a threshold error percentage in step 308 (of flowchart 300) to determine if there is sufficient equivalence to allow the applicant to have access to the secure item. Other comparison schemes could be utilized as will be understood by those skilled in the arts based on the discussion herein. These other comparison schemes are within the scope of the present invention.

As discussed, the feature processor 408 performs the steps 606–616 in flowchart 600 (FIG. 6), and the processor 124 performs the steps 1402–1410 in flowchart 1400 (FIG. 14). As such, the mentioned steps may exist as computer software that is operated on one or more processors, as will be understood by those skilled in the relevant arts. The software may exist as a computer program product (i.e. article of manufacture) comprised of computer program code embodied on a computer useable medium. Exemplary computer useable medium include hard disks, floppy disks, optical disks, application specific integrated circuits (ASICs), and related memory chips. In other words, any software or hardware/software implementations of this invention (including operations performed by processors) are within the scope and spirit of the invention.

b. Card Storage Medium

As stated above, card 110 includes a medium 112 that stores the facial features of the card owner 102 and may also include optional text 114. Medium 112 can be any type of medium that is reasonably portable and has a storage capacity sufficient to store the feature data 106. In one embodiment, the medium 112 is a magnetic storage medium, such as a standard magnetic strip that is on a standard ATM card or a credit card.

Figure 9A:
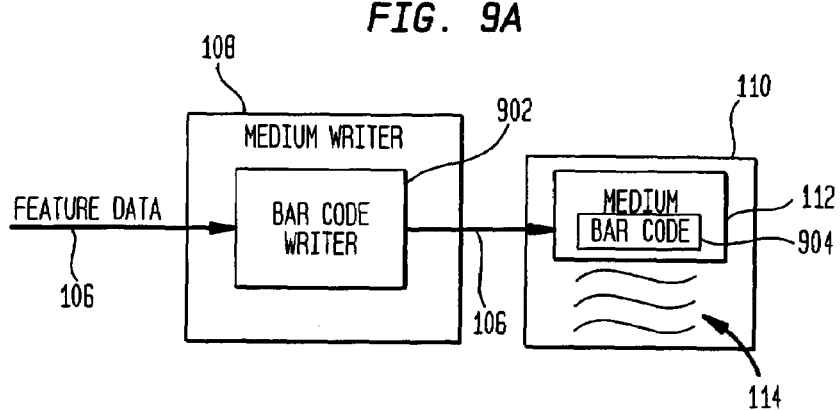
FIG. 9A illustrates an optical bar code writer 902 according to embodiments of the invention.
Figure 9B:
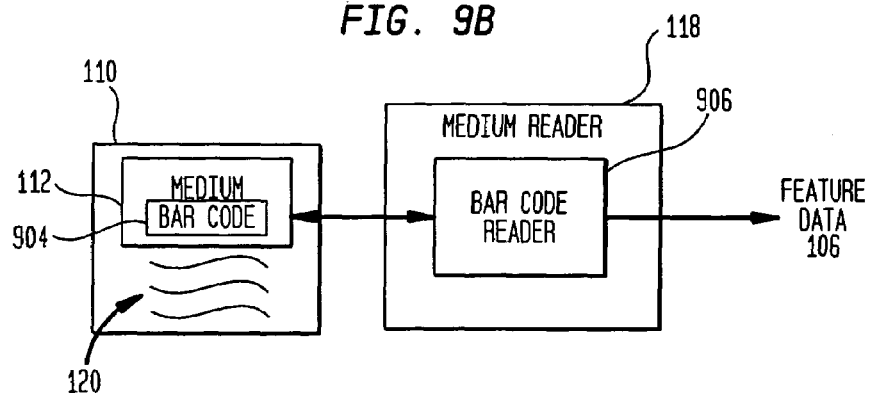
FIG. 9B illustrates an optical bar code reader 906 according to embodiments of the invention.

In an alternate embodiment, the medium 112 is an optical bar code, including but not limited to a 1-dimensional bar code, 2-dimensional bar code, or a 3-dimensional bar code. This is illustrated in FIGS. 9A and 9B. In FIG. 9A, the medium writer 108 includes bar code writer 902 that generates a bar code 904 to store the feature data 106 of the card owner. Likewise in FIG. 9B, the medium reader 118 includes a bar code reader 906 to read the bar code 904 when the card is presented by the applicant. In general, bar codes are very durable mediums in which to store data as will be understood by those skilled in the relevant arts. Bar codes are typically more durable than magnetic media as bar codes are not easily rubbed off, and there is no risk of de-magnetization. Furthermore, bar code scanning is a non-contact process, unlike the contact process that used with magnetic media. Bar code durability can be further improved by adding a clear coating (e.g. plastic laminate) over the card.

In a preferred embodiment, the bar code 904 is a 2-dimensional bar code. An exemplary 2-D bar code is the PDF417, which can achieve a storage capacity of approximately 1100 bytes of data per square inch. Two square inches of PDF417 can hold 2 K bytes which is enough storage capacity to hold the feature data 106, which is preferably below 2 K bytes for most applications. As such, a PFD417 bar code that is encoded with feature data can easily fit on an access card that is approximately the size of an ATM card or employee badge. This is further illustrated by access card 2002 that is depicted as an ATM card, having a 2-D bar code 2004 and optional text 2006. Bar code 2004 includes the feature data of the card owner, and may also include the name and account number of the card owner as written on the ATM card. Further features of the PDF417 2-D bar code are described in U.S. Pat. No. 5,304,786, titled "High Density Two Dimensional Bar Code Symbol", which is incorporated herein by reference in its entirety.

5. Alternative System Embodiment for the Invention

In the recorder system 100 (FIG. 1A), the facial feature data is stored in the medium 112 of the access card 110. In an alternate embodiment, the facial feature data is not stored in the card medium. Instead, an identification code that simply identifies the card owner is stored in the card medium, and the facial feature data is stored in a computer memory that is accessed using the identification code. This embodiment is further described in FIG. 11, which includes a recorder system 1101 for recording the facial features of a card owner 1104, and a reader system 1118 for determining if the applicant 1122 is the card owner 1104 for security access purposes. The recorder system 1101 and reader system 1118 may be separated by a significant distance and therefore may be connected by communications lines 1127, as shown.

Figure 11:
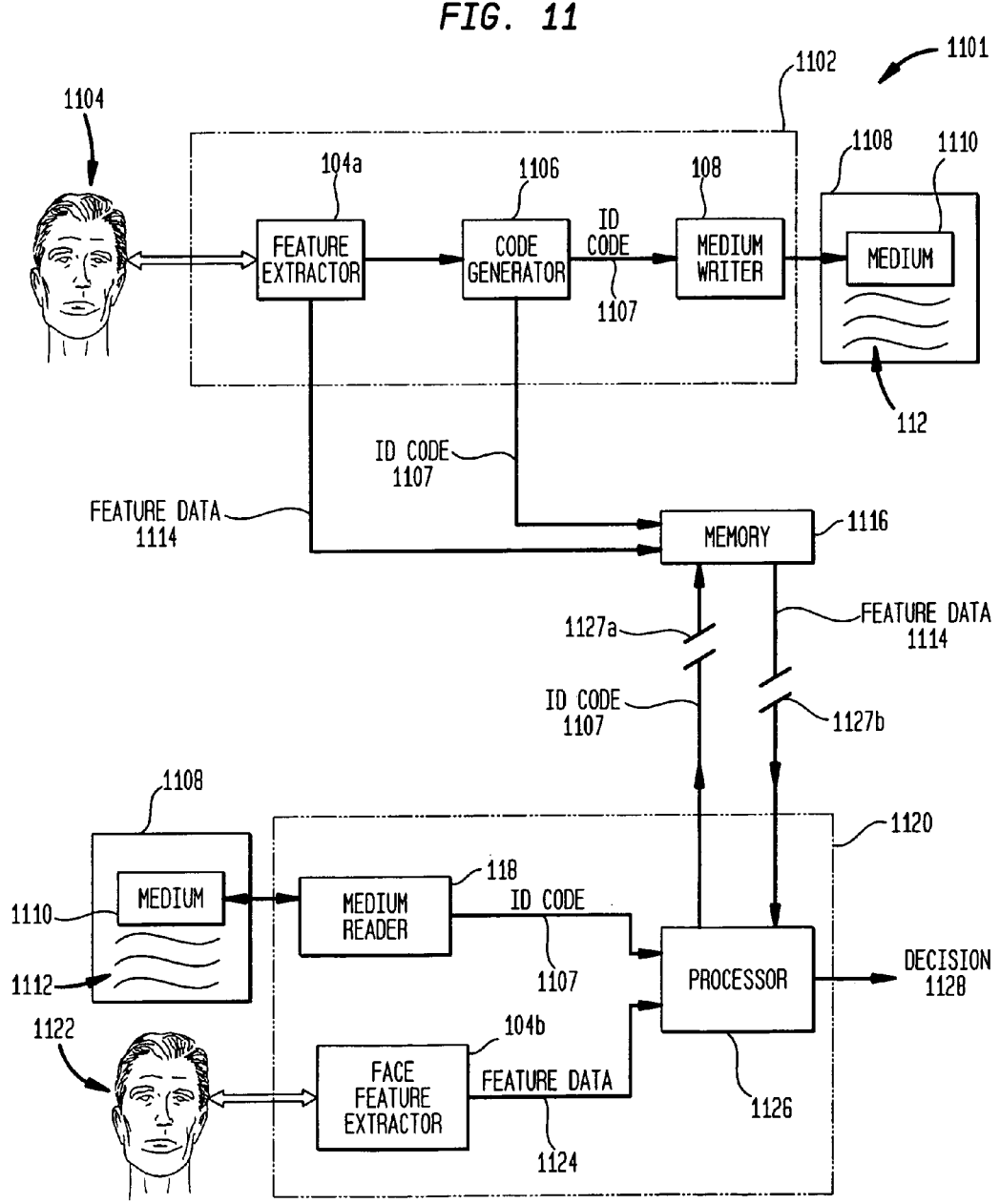
FIG. 11 illustrates an alternative security system according to embodiments of the invention.
Figure 12:
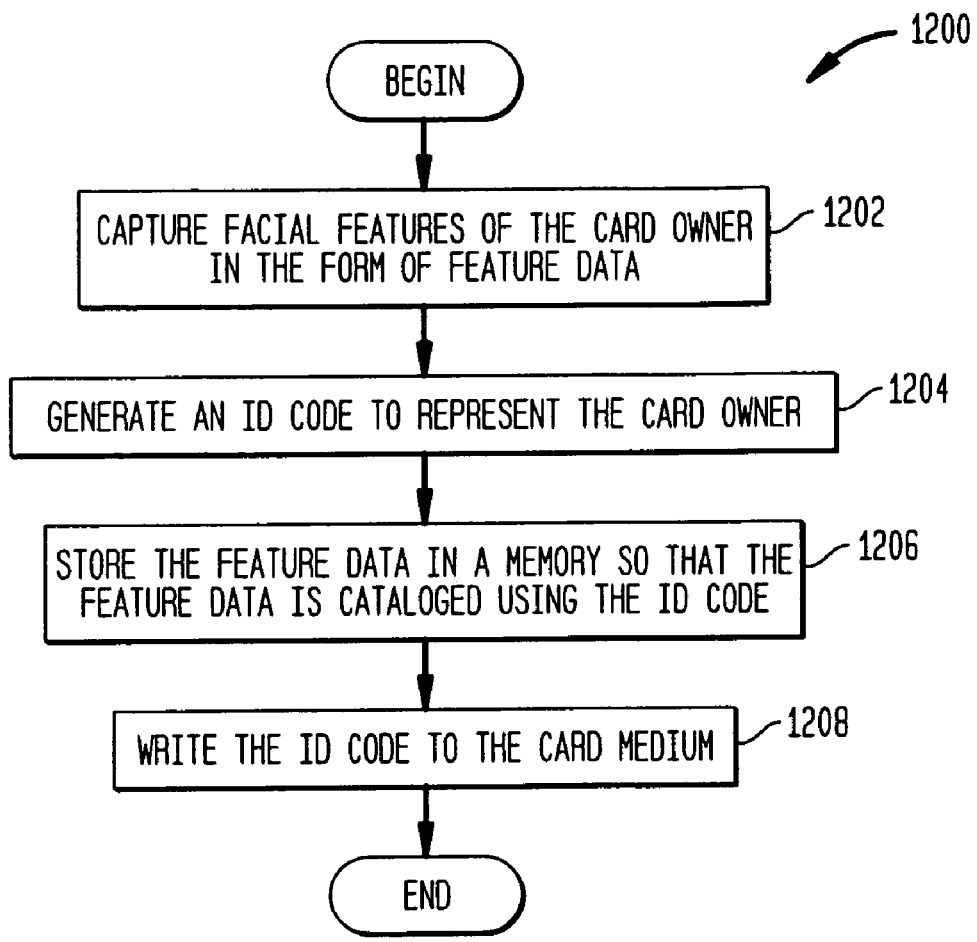
FIG. 12 illustrates a flowchart 1200 for recording facial features in a memory, according to embodiments of the invention.

Referring now to FIG. 11, recorder system 1101 includes: face recorder 1102 having face feature extractor 104a, code generator 1106 and medium writer 108; card 1108 having medium 1110 and optional text 1112; and memory 1116. Recorder system 1101 is further described with reference to operational flowchart 1200 in FIG. 12 as follows.

Referring now to flowchart 1200, in step 1202, feature extractor 104a captures the facial features of the card owner 1104 and generates representative feature data 1114. Feature extractor 104a sends the feature data 1114 to the memory 1116 for storage.

In step 1204, the code generator 1106 generates an ID code 1107 to represent the card owner 1104. The ID code 1107 may be an access code or employee number in building security applications. Alternatively, the ID code 1107 may be an account number in financial applications. The code generator 1106 sends the ID code 1107 to the memory 1116 and to the medium writer 108.

In step 1206, the memory 1116 stores the feature data 1114 cataloged by the ID code 1107. Preferably, memory 1116 is be large data bank that stores the feature data files for multiple card owners 1104, as would be case for building access applications and financial applications (i.e. ATMs) of the invention. The feature data for the card owner 1104 can be retrieved from the memory 1116 by referencing the corresponding ID code 1107.

In step 1208, the medium writer 108 records the ID code 1107 in the medium 1110 of the card 1108. The medium 1110 can be any type of medium that can store a typical access code including but not limited to a magnetic medium and an optical bar code medium. It is noted that the medium 1110 requires less storage capacity than the medium 112 of card 110, because medium 1110 is only storing the an ID code to reference the facial feature data, and not the facial feature data itself Once the ID code 1107 is stored on card 1110, the card owner 1104 can use the card 1110 to interface with associated security systems that operate according to the present invention, such as reader system 1118.

Figure 13:
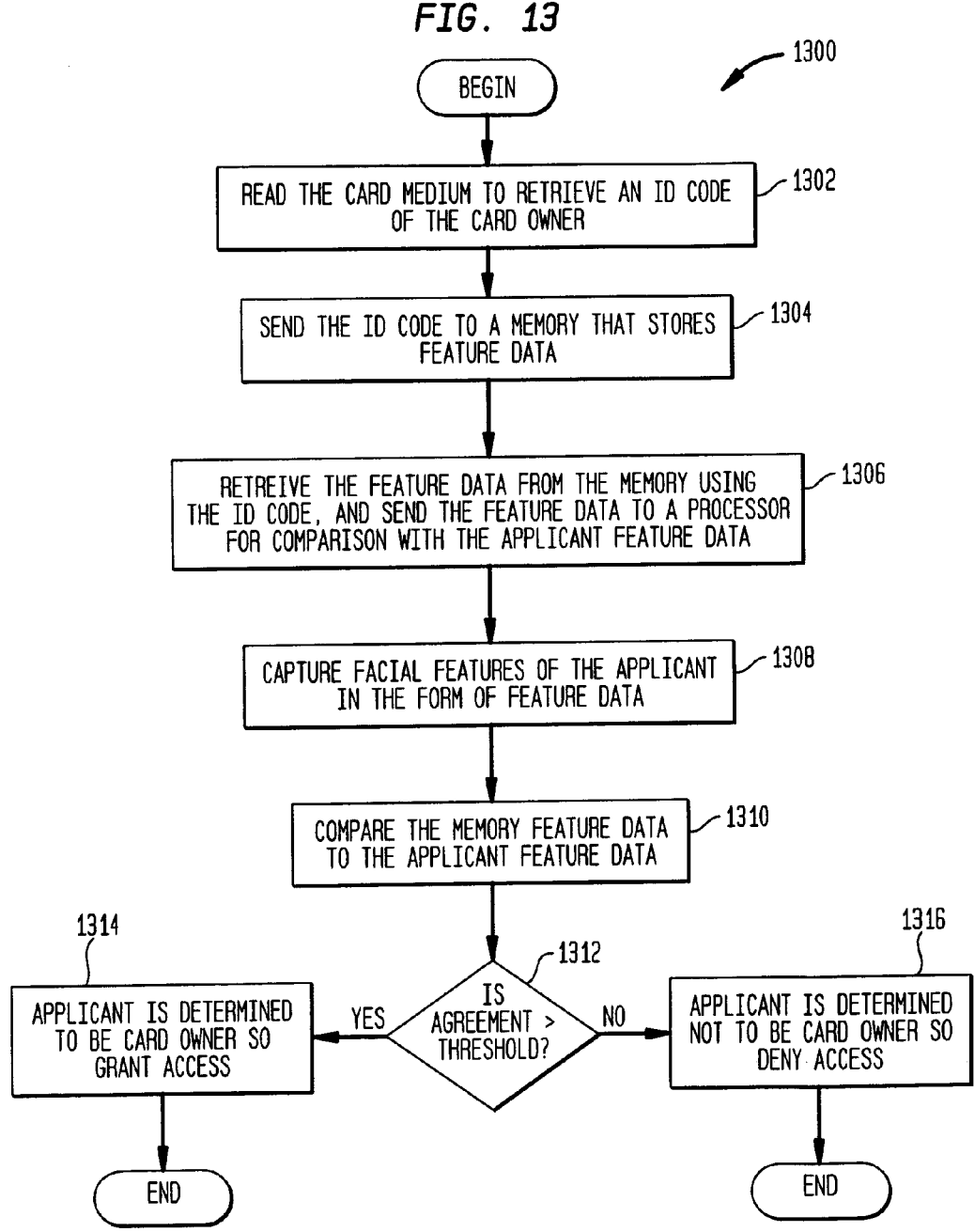
FIG. 13 illustrates a flowchart 1300 for determining if an applicant is the owner of an access card for security access purposes, according to embodiments of the present invention.

Referring now to reader system 1118, applicant 1122 has presented the card 1108 to the face recognizer 1120 in order to gain access to some restricted item (as those mentioned above). Recognizer 1120 includes medium reader 118, face feature extractor 104b, and processor 1126. Recognizer 1120 compares the relevant facial features of applicant 1122 to those features stored in memory 1116 for the applicant 1122, and generates a decision 1128 that indicates whether applicant 1122 is the card owner 1104. In other words, recognizer 1120 determines whether the features of applicant 1122 are sufficiently close to those recorded on memory 1116 to allow access for the applicant 1122. Recognizer 1120 is further described with reference to operational flowchart 1300 that is shown in FIG. 13.

Referring now to flowchart 1300, in step 1302, the medium reader 118 reads the medium 1110 of the access card 1108 to retrieve the ID code 1107. Medium reader 118 sends the ID code 1107 to the processor 1126.

In step 1304, the processor 1126 sends the ID code 1107 to the memory 1116 over the communications line 1127a.

In step 1306, the memory 1116 retrieves the facial feature data 1114 that corresponds to the ID code 1107, and sends it to the processor 1126 over the communications lines 1127b. Various known modems and communications devices and networks are included as necessary to communicate over communications lines 1127.

In step 1308, face feature extractor 104b captures the necessary facial features of the applicant 1122, and generates feature data 1124.

In step 1310, the processor 1126 compares the feature data 1114 retrieved from the memory 1116 with the feature data 1124 from the applicant, to determine the level of agreement.

In step 1312, the processor 1126 determines if the level of agreement between the feature data 1114 and the feature data 1124 is above a specified threshold. If yes, then the processor 1126 determines that the applicant 1122 is the card owner 1104, and access is granted in step 1314. If agreement is not sufficient, then the processor 1126 determines that the Applicant 1122 is not the card owner 1104, and access is denied in step 1316.

6. Application Embodiments of the Invention

The present invention can be used in a wide variety of security applications. FIGS. 15–18 illustrate some of these applications for example purposes only, and without limitation. Other applications will be apparent to those skilled in the arts based discussion given herein. These other applications are within the scope and spirit of the present invention.

Figure 15:
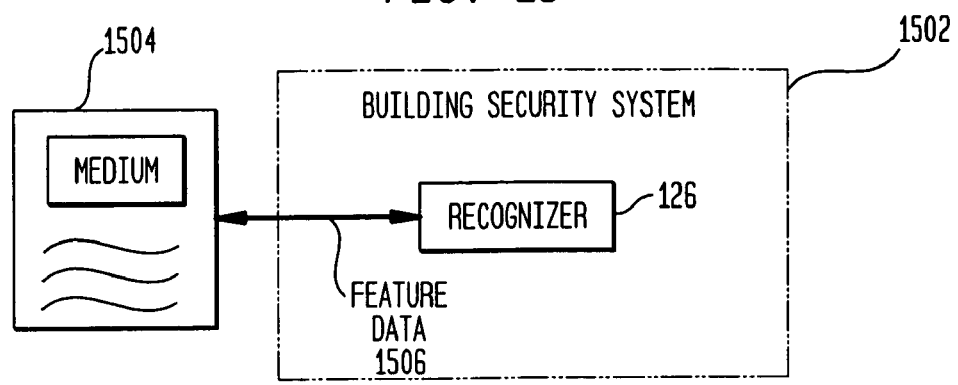
FIG. 15 illustrates a building security system 1502 according to embodiments of the present invention.

FIG. 15 illustrates a building security system 1502 that controls access to an associated building. Building security system 1502 includes the recognizer 126 to read access cards 1504 that carry facial feature data 1506 according to embodiments of the present invention.

Figure 16:
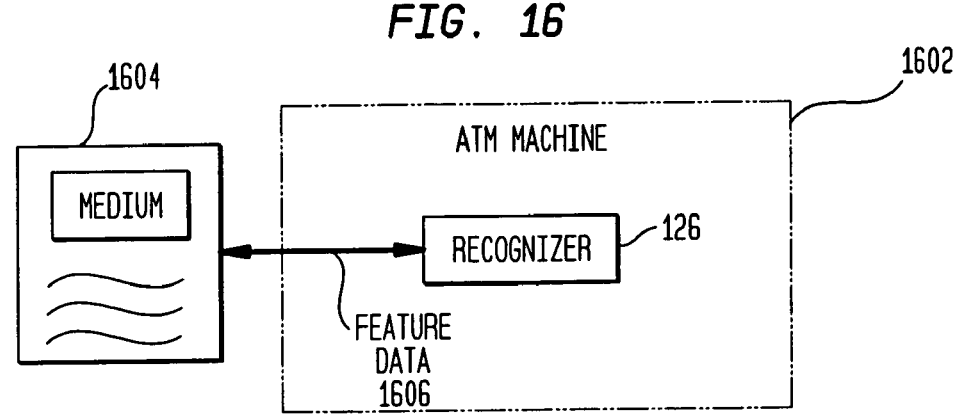
FIG. 16 illustrates an ATM machine 1602 according to embodiments of the present invention.

FIG. 16 illustrates an ATM machine 1602 that controls access to associated financial accounts. ATM machine 1602 includes the recognizer 126 to read ATM cards 1604 that carry facial feature data 1606 according to embodiments of the present invention.

Figure 17:
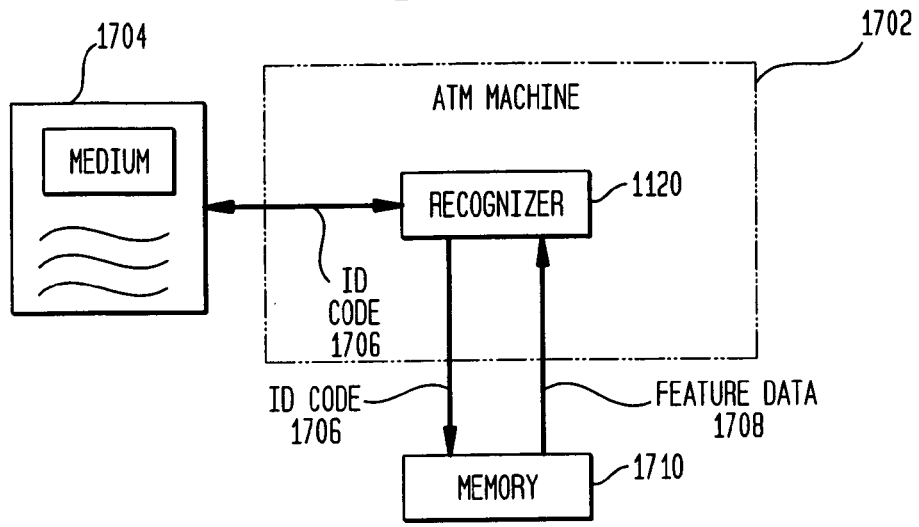
FIG. 17 illustrates a second ATM machine 1702 according to embodiments of the present invention.

FIG. 17 illustrates an ATM machine 1702 that controls access to associated financial accounts. ATM machine 1702 includes the recognizer 1120 to read ATM cards 1704 that carry ID codes 1706 according to embodiments of the present invention. Recognizer 1120 then retrieves facial feature data 1708 from a memory 1710 using the ID code 1706.

Figure 18:
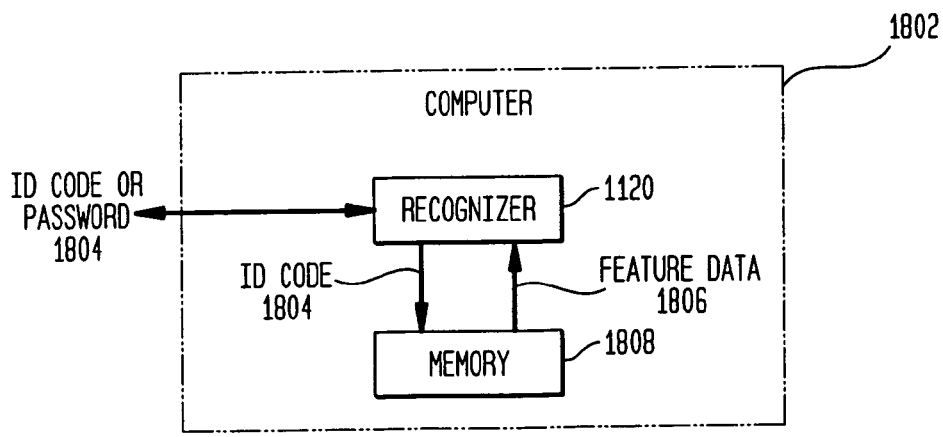
FIG. 18 illustrates a computer 1802 according to embodiments of the present invention.

FIG. 18 illustrates a computer 1802. Computer 1802 includes the recognizer 1120 to control access to the computer based on an ID code (or password) 1804 that is provided by an applicant. The recognizer 1120 then retrieves the facial feature data 1806 of the computer owner (or legitimate user) from a memory 1808 using the ID code 1804.

7. Exemplary Computer System

Figure 19:
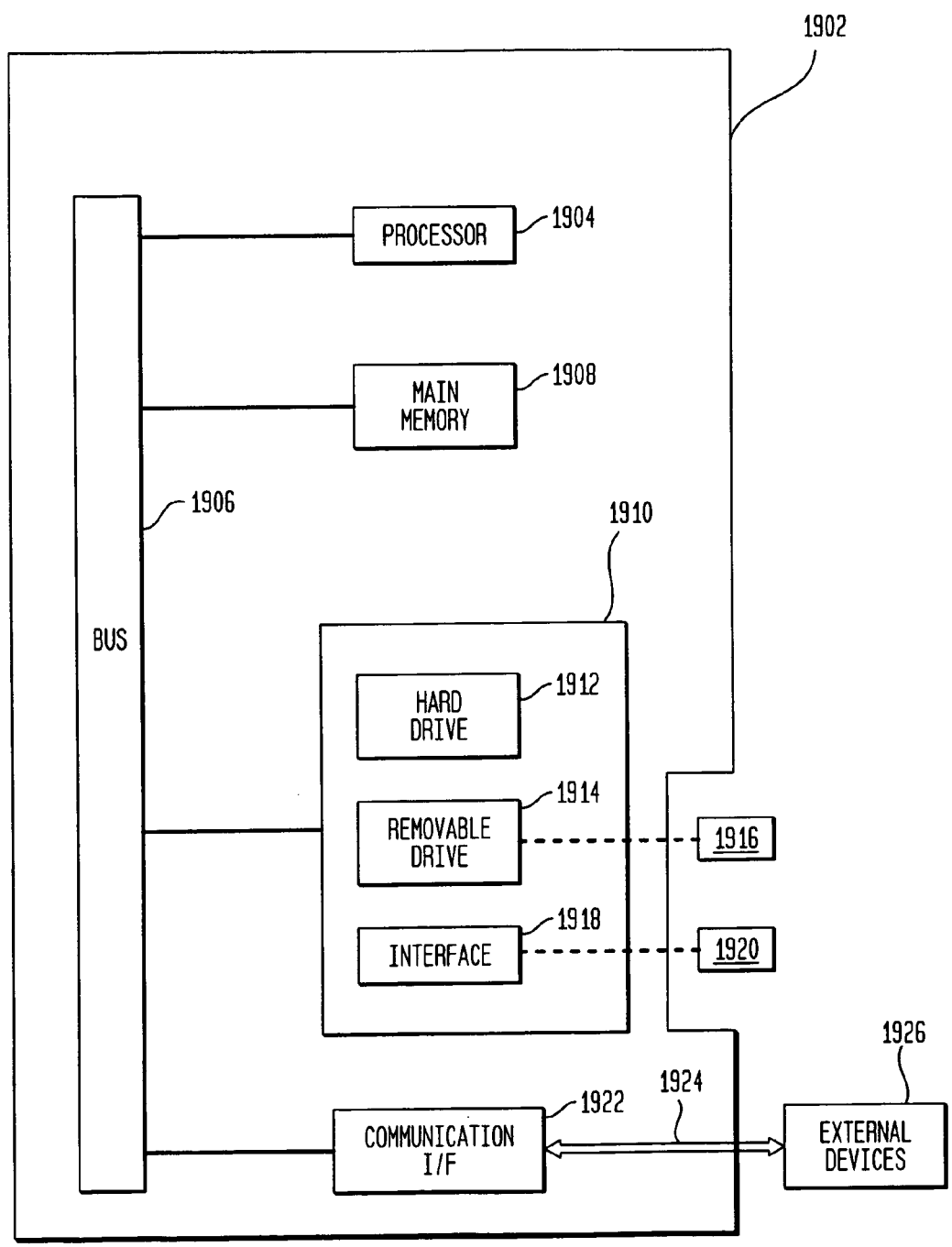
FIG. 19 illustrates an exemplary computer system 1902, for implementing embodiments of the present invention.
Figure 20:
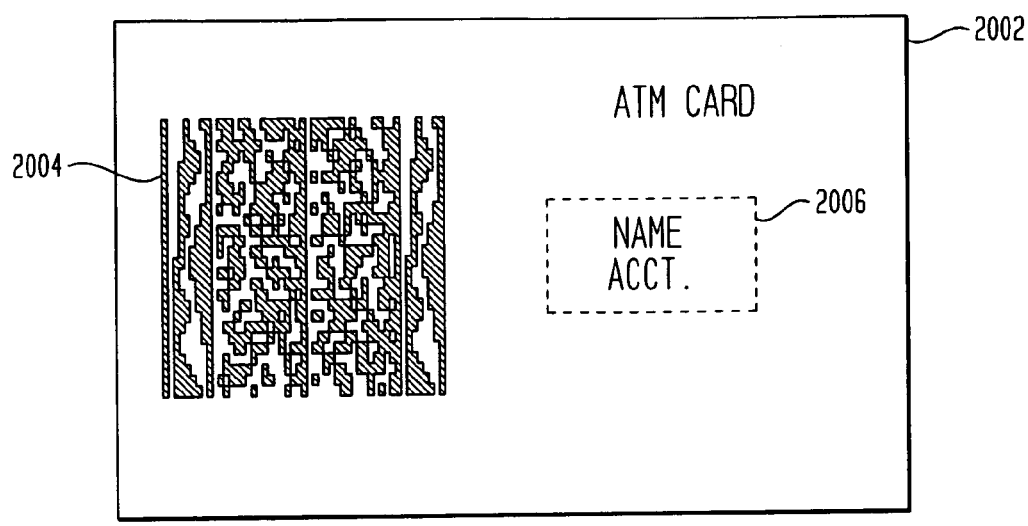
FIG. 20 illustrates an access card 2002 according to embodiments of the invention.

Embodiments of invention may be implemented using hardware, software or a combination thereof and may be implemented in a computer system or other processing system, including processors 124 and 408. In fact, in one embodiment, the invention is directed toward a software and/or hardware embodiment in a computer system. An example computer system 1902 is shown in FIG. 19. The computer system 1902 includes one or more processors, such as processor 1904. The processor 1904 is connected to a communication bus 1906. The invention can be implemented in various software embodiments that can operate in this example computer system. After reading this description, it will become apparent to a person skilled in the relevant art how to implement the invention using other computer systems and/or computer architectures.

Computer system 1902 also includes a main memory 1908, preferably a random access memory (RAM), and can also include a secondary memory or secondary storage 1910. The secondary memory 1910 can include, for example, a hard disk drive 1912 and a removable storage drive 1914, representing a floppy disk drive, a magnetic tape drive, an optical disk drive, etc. The removable storage drive 1914 reads from and/or writes to a removable storage unit 1916 in a well known manner. Removable storage unit 1916, represents a floppy disk, magnetic tape, optical disk, etc. which is read by and written to by removable storage drive 1914. As will be appreciated, the removable storage unit 1916 includes a computer usable storage medium having stored therein computer software and/or data.

In alternative embodiments, secondary memory 1910 may include other similar means for allowing computer software and data to be loaded into computer system 1902. Such means can include, for example, a removable storage unit 1920 having a storage interface 1918. Examples of such can include a program cartridge and cartridge interface (such as that found in video game devices), a removable memory chip (such as an EPROM, or PROM) and associated socket, and other removable storage units 1920 and interfaces 1918 which allow software and data to be transferred from the removable storage unit 1920 to the computer system 1902.

Computer system 1902 can also include a communications interface 1922. Communications interface 1922 allows software and data to be transferred between computer system 1902 and external devices 1926. In one embodiment, the external devices 1926 are one or more medium readers 118, medium writers 108, cameras 404, and external memories 1116. Examples of communications interface 1922 can include a modem, a network interface (such as an Ethernet card), a communications port, a PCMCIA slot and card, etc. Software and data transferred via communications interface 1922 are in the form of signals, which can be electronic, electromagnetic, optical or other signals capable of being received by the communications interface 1922. These signals are provided to the communications interface 1922 via a channel 1924. This channel 1924 can be implemented using wire or cable, fiber optics, a phone line, a cellular phone link, an RF link and other communications channels.

In this document, the terms "computer program medium" and "computer usable medium" are used to generally refer to media such as the removable storage devices 1916 and 1918, a hard disk installed in hard disk drive 1912, semiconductor memory devices including RAM and ROM associated with processor 1904, and associated signals. These computer program products are means for providing software instructions (including computer programs having computer program code that embody the invention) and/or data to the computer system 1902 and associated processors 1904.

Computer programs (also called computer control logic or computer program logic) are generally stored in main memory 1908 and/or secondary memory 1910 and executed therefrom. Computer programs can also be received via communications interface 1922. Such computer program can also exist in RAM, ROM, or other semiconductor memory included in, or associated with processors 1904. Such computer programs, when executed, enable the computer system 1902 to perform some of the features of the present invention as discussed herein. In particular, the computer programs, when executed, enable the processor 1904 to perform some of the features of the present invention. Accordingly, such computer programs represent controllers of the computer system 1902.

In an embodiment where the invention is implemented using software, the software may be stored in a computer program product and loaded into computer system 1902 using removable storage drive 1914, hard drive 1912 or communications interface 1922. The control logic (software), when executed by the processor 1904, causes the processor 1904 to perform the functions of the invention as described herein.

In another embodiment, the invention is implemented primarily in hardware using, for example, hardware components such as application specific integrated circuits (ASICs), stand alone processors (such as processors 124 and 408), and DSPs. Implementation of the hardware state machine so as to perform the functions described herein will be apparent to persons skilled in the relevant art(s).

In yet another embodiment, the invention is implemented using a combination of both hardware and software.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments include but are not limited to hardware, software, and software/hardware implementations of the methods, systems, and components of the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A security method of controlling access of human beings to a secure item, the method comprising the steps of:
   (1) retrieving an identification code from an identification object;
   (1a) retrieving feature data from a memory using said identification code, said retrieved feature data representative of a plurality of facial features of a first person;
   (2) capturing a plurality of facial features of a second person by taking pictures at different positions around said second person's head and generating feature data that is representative of facial features of said second person; and
   (3) comparing said retrieved feature data of said first person to said second person feature data to determine security access for said second person, including
      determining a plurality of errors that represent a difference between said plurality of facial features of said first person and a corresponding plurality of facial features of said second person,
      determining an average error of said plurality of errors to determine security access of said second person.

2. The method of claim 1, further comprising the steps of:
   (4) granting access to said second person if agreement between said retrieved feature data and said second person feature data is above a threshold; and
   (5) denying access to said second person if agreement between said retrieved feature data and said second person feature data is below said threshold.

3. The method of claim 1, wherein step (1) comprises the step of reading a magnetic medium to retrieve said identification code.

4. The method of claim 1, wherein step (1) comprises the step of reading an optical medium to retrieve said identification code.

5. The method of claim 1, wherein step (1) comprises the step of reading a bar code to retrieve said identification code.

6. The method of claim 1, wherein step (1) comprises the step of reading a 2-dimensional bar code to retrieve said identification code.

7. The method of claim 1, wherein step (2) comprises the steps of:
   (a) generating image data from said pictures;
   (b) determining a first separation distance on a face of said second person using said image data;
   (c) determining a second separation distance on said face of said second person using said image data; and
   (d) normalizing said second separation distance relative to said first separation distance resulting in a ratio that is included in said second person feature data.

8. The method of claim 1, wherien step (2) comprises the steps of:
   (a) generating image data from said pictures;
   (b) determining an eye-to-eye separation on a face of said second person using said image data;
   (c) determining a second separation distance on said face of said second person using said image data; and
   (d) normalizing said second separation distance relative to said eye-to-eye separation resulting in a ratio that is included in said second person feature data.

9. The method of claim 1, wherein step (2) comprises the steps of:
   (a) generating image data from said pictures;
   (b) determining an eye-to-eye separation on a face of said second person using said image data;
   (c) determining a forehead-to-chin separation on said face of said second person using said image data; and
   (d) normalizing said forehead-to-chin separation relative to said eye-to-eye separation resulting in a ratio that is included in said feature data.

10. The method of claim 1, wherein step (2) comprises the steps of:
    (a) generating image data from said pictures;
    (b) determining an eye-to-eye separation of said second person using said image data;
    (c) determining an ear-to-ear separation of said second person using said image data; and
    (d) normalizing said ear-to-ear separation relative to said eye-to-eye separation resulting in a ratio that is included in said second person feature data.

11. The method of claim 1, wherein step (2) comprises the steps of:
    (a) generating image data from said pictures; and
    (b) determining a separation distance between first and second features on a face of said second person, said second person feature data representative of said separation distance.

12. The method of claim 11, further comprising the steps of:
    (c) determining a second separation distance between a third feature and a fourth feature on the face of said second person; and (d) normalizing said second separation distance relative to said first separation distance.

13. The method of claim 11, wherein step (b) comprises the steps of:
   (i) locating a first eye and a second eye of said second person; and
   (ii) determining an eye-to-eye separation between said first and second eye.

14. The method of claim 1, further comprising the steps of:
   (4) capturing said facial features of said first person; and
   (5) storing said first person feature data in said memory prior to step (1).

15. The method of claim 1, wherein step (3) comprises the step of comparing a normalized forehead-to-chin separation of said first person with a normalized forehead-to-chin separation of said second person.

16. The method of claim 1, wherein step (3) comprises the step of comparing a normalized nostril-to-nostril separation of said first person with a normalized nostril-to-nostril separation of said second person.

17. The method of claim 1, wherein step (3) comprises the step of comparing a normalized feature separation of said first person with a normalized feature separation of said second person.

18. The method of claim 1, wherein the pictures are taken using a single rotating camera.

19. The method of claim 1, wherein the pictures are taken using multiple cameras that take pictures at multiple angles.

20. The method of claim 1, wherein said first person is said second person.

21. A method of limiting security access to an authorized card owner, the method comprising the steps of:
   (1) reading a medium of an access card to retrieve an identification code of the card owner;
   (1a) retrieving feature data from a storage memory in a remote location using said identification code, said retrieved feature data representative of a plurality of facial features of the card owner;
   (2) taking pictures of an applicant at different positions around said applicant's head and determining a plurality of facial features of the applicant using the pictures; and
   (3) comparing said facial features of the card owner with said facial features of the applicant to determine access of the applicant, including
      determining a plurality of errors that represent a difference between said plurality of facial features of the card owner and a corresponding plurality of facial features of the applicant,
      determining an average error of said plurality of errors to determine security access of the applicant.

22. The method of claim 21, further comprising the steps of:
   (4) granting access to the applicant if there is sufficient agreement between said applicant facial features and said card owner facial features; and
   (5) denying access to the applicant if there is there is not sufficient agreement between said applicant facial features and said card owner facial features.

23. A method of determining if an applicant is the owner of an access card for security purposes, the method comprising the steps of:
   (1) reading a bar code on an access card, said bar code having feature data representative of a plurality of facial features of a card owner, said feature data including a normalized forehead-to-chin separation distance of said card owner;
   (2) capturing a plurality of facial features of an applicant and generating applicant feature data that is representative of said applicant facial features, said step (2) comprising the steps of
      (a) taking pictures of the applicant at different positions rotated around the applicant's head,
      (b) determining an eye-to-eye separation of the applicant using said pictures, and
      (c) determining a forehead-to-chin separation distance on a face of the applicant using said pictures, and normalizing said forehead-to-chin separation distance to said eye-to-eye separation;
   (3) comparing said applicant feature data to said card feature data to determine security access, comprising
      comparing said normalized forehead-to-chin separation distance of said applicant with said normalized forehead-to-chin separation distance of said card owner that is included in said card feature data
      determining a plurality of errors that represent a difference between said plurality of facial features of the card owner and a corresponding plurality of facial features of the applicant,
      determining an average error of said plurality of errors to determine security access of the applicant.

24. A method of recording facial features of a person in a storage medium, the method comprising the steps of:
   (1) taking pictures of the person at different positions with a camera that rotates around the person's head;
   (2) generating feature data representative of facial features of the person, said feature data including a forehead-to-chin separation distance; and
   (3) writing said feature data to said storage medium, said feature data capable of providing security access to that person.

25. The method of claim 24, wherein step (3) comprises the step of writing said feature data to a magnetic medium on an access card.

26. The method of claim 24, wherein step (3) comprises the step of writing said feature data to an optical storage medium on an access card.

27. The method of claim 24, wherein step (3) comprises the step of writing said feature data to a bar code on an access card.

28. The method of claim 24, wherein step (3) comprises the steps of:
   (a) writing an ID code associated with the person to an access card; and
   (b) storing said feature data in a memory that is cataloged using said ID code.

29. The method of claim 24, wherein step (2) of generating feature data comprises the steps of:
   (a) determining an eye-to-eye separation distance using said picture;
   (b) determining a forehead-to-chin separation distance using said pictures; and
   (c) normalizing said forehead-to-chin separation distance relative to said eye-to-eye separation distance resulting in a ratio that is included in said feature data.

30. A system for determining security access of an applicant, comprising:
   a medium reader, for reading an access card medium to retrieve an identification code associated with a card owner;

a memory that stores facial feature data that is cataloged according to said identification code;

a rotating camera for taking pictures at different positions around said applicant's head and generating feature data representative of facial features of said applicant; and a processor for comparing said card feature data to said applicant feature data to determine security access, wherein said processor determines a plurality of errors that represent differences between said stored facial feature data and said applicant feature data, and determines an average error of said plurality of errors to determine security access of the applicant.

31. The system of claim 30, wherein said medium reader comprises a magnetic reader for reading a magnetic card medium on said access card to retrieve said identification code.

32. The system of claim 30, wherein said medium reader comprises a bar code reader for reading a bar code medium on said access card to retrieve said identification code.

33. The system of claim 32, wherein said bar code reader comprises a means for reading a 2 dimensional bar code.

34. The system of claim 33, further comprising a means for generating said image data from said pictures.

35. The system of claim 34, wherein said means for generating said image data comprises a computer scanner.

36. The system of claim 30, further comprising:

a second processor for generating said applicant feature data based on image data that is representative of said picture, said processor determining a separation distance based on a first facial feature and a second facial feature, said applicant feature data including said separation distance.

37. The system of claim 36, wherein said rotating camera is a digital camera, said digital camera generating said image data from said pictures.

38. The system of claim 30, wherein said memory is in a remote location relative to at least one of said medium reader, said feature extractor, and said processor.

39. A system for determining security access of an applicant, comprising:

a medium reader, for reading an access card medium to retrieve an identification code that identifies a card owner;

a memory that stores facial feature data that is cataloged according to said identification code;

a rotating camera for taking pictures at different positions around of the applicant's head, said rotating camera including a means for generating image data representative of said pictures; and a processor coupled to said medium reader and said camera, said processor including computer program code for causing said processor to determine if the applicant is the card owner using said image data of said applicant and said card feature data, said computer program code comprising, first program code means for causing said processor to determine a plurality of applicant feature separations using said image data, said applicant feature separations representing a distance between a first feature and a second feature on a face of said applicant, second program code means for causing said processor to access said memory using said identification code and to retrieve a plurality of card owner feature separations, said card owner feature separations representing a distance between a first feature and a second feature on a face of said card owner, and third program code means for causing said processor to compare said card owner feature separations to said applicant feature separations and determine agreement for security access, wherein said third program means includes program means for determining a plurality of errors that represent a difference between said plurality of card owner feature separations and a corresponding plurality of applicant feature separations, and program means for determining an average error of said plurality of errors to determine security access.

40. The system of claim 39, wherein said program code means further comprises:

fourth program code means for causing said processor to grant access to the applicant if agreement is above a threshold; and fifth program code means for causing said processor to deny access to the applicant if agreement is below a threshold.

41. The system of claim 39, wherein said medium reader is a bar code reader.

42. The system of claim 41, wherein said plurality of card owner feature separations include a normalized ear-to-ear separation of the card owner, and wherein said plurality of applicant feature separations include a normalized ear-to-ear separation of the applicant.

43. The system of claim 39, wherein said plurality of card owner feature separations are normalized to an eye-to-eye separation of the card owner, and wherein said first program code means comprises program code means for causing said processor to determine an eye-to-eye separation of the applicant using the image data, and normalize said plurality of applicant feature separations relative to said eye-to-eye separation of the applicant.

44. The system of claim 39, wherein said plurality of card owner feature separations include a normalized forehead-to-chin separation of the card owner, and wherein said plurality of applicant feature separations include a normalized forehead-to-chin separation of the applicant.

45. The system of claim 39, wherein said plurality of card owner feature separations include a normalized nostril-to-nostril separation of the card owner, and wherein said plurality of applicant feature separations include a normalized nostril-to-nostril separation of the applicant.

46. An access card for use with a security system, said access card comprising a storage medium that stores an identification code associated with an owner of said access card, wherein said identification code catalogs feature data in a memory external to said access card, said feature data generated by a camera that rotates around said owner's head and representative of facial features associated with said owner of the access card, said security system configured to provide security access to said owner based on said feature data.

47. The access card of claim 46, wherein said medium is a bar code.

48. The access card of claim 46, wherein said feature data includes separation distances associated with said facial features of said card owner.

49. A method of controlling security access of humans, comprising:

retrieving an identification code from an identification object;

retrieving feature data from a memory using said identification code, said retrieved feature data representative of a plurality of facial features of a first person, said plurality of facial features normalized to an eye-to-separation of said first person;

capturing a plurality of facial features of a second person including taking pictures at different positions around said second person's head with a single camera that rotates around said second person's head, and generating applicant feature data from said pictures that is representative of facial features of said second person, including locating a first eye and a second eye of said second person using said applicant feature data, determining an eye-to-eye separation on a face of said second person using said applicant feature data, determining a forehead-to-chin separation on said face of said second person using said applicant feature data, normalizing said forehead-to-chin separation relative to said eye-to-eye separation resulting in a normalized forehead-to-chin ratio of said second person, determining a nostril-to-nostril separation distance between a first nostril and a second nostril on said face of said second person using said applicant feature data, normalizing said nostril-to-nostril separation distance relative to said eye-to-eye separation resulting in a normalized nostril-to-nostril separation ratio of said second person, determining an ear-to-ear separation distance between a first ear and a second ear on said face of said second person using said applicant feature data, normalizing said ear-to-ear separation distance relative to said eye-to-eye separation resulting in a normalized ear-to-ear ratio of said second person;

comparing said normalized ratios of said second person with corresponding ratios of said retrieved features data of said first person, including determining a difference between a normalized nostril-to-nostril separation ratio of said first person and said normalized nostril-to-nostril separation ratio of said second person, resulting in a first ratio error, determining a difference between a normalized forehead-to-chin separation ratio of said first person and said normalized forehead-to-chin separation ratio of said second person, resulting in a second ratio error, determining a difference between a normalized ear-to-ear separation ratio of said first person and said normalized ear-to-ear separation ratio of said second person, resulting in a third ratio error, and determining an average error of said first ratio error, said second ratio error, and said third ratio error to determine security access for said second person;

granting access to said second person if said average error is below a threshold; and denying access to said second person if said average error is above said threshold.

\* \* \* \* \*

UNITED STATES PATENT AND TRADEMARK OFFICE
CERTIFICATE OF CORRECTION

| | | |
|---|---|---|
| PATENT NO. | : 7,114,079 B1 | Page 1 of 1 |
| APPLICATION NO. | : 09/518722 | |
| DATED | : September 26, 2006 | |
| INVENTOR(S) | : Cook et al. | |

It is certified that error appears in the above-identified patent and that said Letters Patent is hereby corrected as shown below:

Column 15, line 60, "if there is there is not" should be replaced with --if there is not--.

Signed and Sealed this

Third Day of April, 2007

JON W. DUDAS
*Director of the United States Patent and Trademark Office*